United States Patent [19]
Brams et al.

[11] Patent Number: 5,688,537
[45] Date of Patent: Nov. 18, 1997

[54] MOLD CENTERING SYSTEM FOR INJECTION-MOLDING MACHINE

[75] Inventors: Peter Brams, München; Peter Lichtinger, Fürstenfeldbruck, both of Germany

[73] Assignee: Krauss-Maffei AG, Munich, Germany

[21] Appl. No.: 649,784

[22] Filed: May 17, 1996

[30] Foreign Application Priority Data

May 19, 1995 [DE] Germany .................. 19518480.7

[51] Int. Cl.$^6$ ................................. B29C 45/17
[52] U.S. Cl. .................. 425/186; 264/39; 425/171; 425/173; 425/190; 425/192 R
[58] Field of Search .................. 425/138, 171, 425/173, 186, 190, 192 R, 453, 575; 264/39, 328.9

[56] References Cited

U.S. PATENT DOCUMENTS

| | | | |
|---|---|---|---|
| 4,150,931 | 4/1979 | Gabrys | 425/186 |
| 4,348,165 | 9/1982 | Vostrovsky | 425/192 R |
| 4,500,274 | 2/1985 | Cyriax et al. | 425/186 |
| 5,288,222 | 2/1994 | Wieser | 425/190 |
| 5,302,105 | 4/1994 | Bertleff | 425/190 |
| 5,308,234 | 5/1994 | Nicke et al. | 425/190 |
| 5,449,282 | 9/1995 | Brown et al. | 425/192 R |

FOREIGN PATENT DOCUMENTS

| | | |
|---|---|---|
| 2 233 207 | 2/1974 | Germany . |
| 31 38 794 | 7/1982 | Germany . |
| 39 34 495 | 12/1990 | Germany . |
| 41 00 981 | 7/1992 | Germany . |
| 41 15 957 | 11/1992 | Germany . |

*Primary Examiner*—Jay H. Woo
*Assistant Examiner*—Joseph Leyson
*Attorney, Agent, or Firm*—Herbert Dubno; Andrew Wilford

[57] ABSTRACT

An injection-molding assembly has a fixed mold plate carrying a centering ring, a fixed mold half carrying a centering ring snugly interfitted with the fixed-plate centering ring, a movable mold plate carrying a centering ring, and a movable mold half carrying a centering ring snugly interfitted with the movable-plate centering ring. One of the rings is formed of an outer ring part having a substantially circular outer periphery and a substantially circular inner periphery and of an inner ring part having a substantially circular outer periphery and a Substantially circular inner periphery. The outer periphery of one of the ring parts has a center of curvature offset radially from a center of curvature of the respective inner periphery. The annular parts can be angularly displaced and can be clamped relative to each other.

6 Claims, 4 Drawing Sheets

MOLD CENTERING SYSTEM FOR INJECTION-MOLDING MACHINE

FIELD OF THE INVENTION

The present invention relates to an injection-molding machine. More particularly this invention concerns a system for centering the mold halves in such a machine.

BACKGROUND OF THE INVENTION

A standard injection-molding machine has a fixed mold-support plate normally juxtaposed with an extruder and a movable mold-support plate displaceable along an axis toward and away from the fixed mold plate. Respective fixed and movable mold halves are carried on the support plates and can be mated together to form a mold cavity when the two plates are pressed together.

In modern molding installations where molds are frequently changed it is standard to supply the molds and the mold plates with complementary centering rings intended to align the mold halves perfectly so that, when the mold is closed, they fit together as intended. The centering rings are of standard sizes and are fixed to the mold halves to make changeover easy, in particular in a system where at least one of the support plates is provided with a turntable so that it can align any or several different mold halves with the mold half of the other plate. This is useful for instance in the casting of laminated parts where a layer is injection molded, normally in the fixed mold half, then the mold is opened and a differently shaped movable mold half is mated with the fixed mold half for formation of another layer on the partially formed workpiece.

A fixed mold half is typically changed by fitting it to the movable mold half and then pressing it with its centering ring against the centering ring mounted on the fixed support plate. When alignment is perfect this is not a problem, but often due to sloppy manufacturing tolerances the alignment is somewhat off. In this case the ring on the fixed mold half must normally be unbolted and shifted to correct the misalignment. This is an onerous job entailing wasteful down time of the machine, as the alignment is often a hit-and-miss operation entailing several trials before it is correct.

German patent document 3,138,794 suggests a system for adjusting the upper and lower parts of a cutting tool on installation of same in a guide frame or press by using a ring gauge, but this system is not applicable to the mold halves of an injection-molding machine. In German 2,233,207 an alignment for mold elements of an injection-molding installation is proposed wherein the mold halves can be relatively centered by means of several guide bolts and angularly displaceable guide sleeves. The guide sleeves are formed as eccentric sleeves with an inner surface that is eccentric to its outer surface. Such alignment devices are expensive and difficult to use. They are not readily adaptable to injection-molding systems using centering rings.

In German patent document 4,115,957 of Bertleff describes a mold changing system where one mold half and the respective support plate are provided with mating fittings that are set up to allow automatic replacement of the mold half. Specific means are provided to prevent the parts from tipping during installation so they stay perfectly centered. Similarly German patent document 4,108,981 of Lutz has a bayonet-type coupling between each mold half and the respective support plate.

German patent 3,934,495 of Wieser has a complex adjustment system for mold halves that largely eliminates the conventional centering rings. Another alignment system for mold parts is shown in German patent document 2,233,207 of Emmerichs where pins with tapered ends serve for the final alignment.

None of these systems is readily adaptable to a system using centering rings, and none allows an easy and accurate alignment of mold parts suitable for a high-volume production operation.

OBJECTS OF THE INVENTION

It is therefore an object of the present invention to provide an improved system for aligning mold parts in an injection-molding system.

Another object is the provision of such an improved system for aligning mold parts in an injection-molding system which overcomes the above-given disadvantages, that is which is easy and which exploits the tried-and-true technology using centering rings.

SUMMARY OF THE INVENTION

An injection-molding assembly has a fixed mold plate carrying a centering ring, a fixed mold half carrying a centering ring snugly interfitted with the fixed-plate centering ring, a movable mold plate carrying a centering ring, and a movable mold half carrying a centering ring snugly interfitted with the movable-plate centering ring. According to the invention one of the rings is formed of an outer ring part having a substantially circular outer periphery and a substantially circular inner periphery and of an inner ring part having a substantially circular outer periphery and a substantially circular inner periphery. The outer periphery of one of the ring parts has a center of curvature offset radially from a center of curvature of the respective inner periphery. The annular parts can be angularly displaced and can be clamped relative to each other.

With this system it is possible to accurately compensate for any offset in a reproducible manner. Once the offset is determined, both with respect to its angular direction and distance, it is a relatively simple matter to set the adjustable two-part ring to compensate for it.

According to the invention the one ring part is the outer ring part and the one ring is the fixed-plate centering ring. The one ring is provided with angularly extending centering scales that cooperate with each other and with indicia on the element carrying them.

Furthermore in accordance with this invention the outer ring part is provided with a plurality of angularly extending slots. The clamping system includes bolts traversing the slots. The ring parts are of interritting L-section.

BRIEF DESCRIPTION OF THE DRAWING

The above and other objects, features, and advantages will become more readily apparent from the following description, reference being made to the accompanying drawing in which.

SPECIFIC DESCRIPTION

Figure 1:
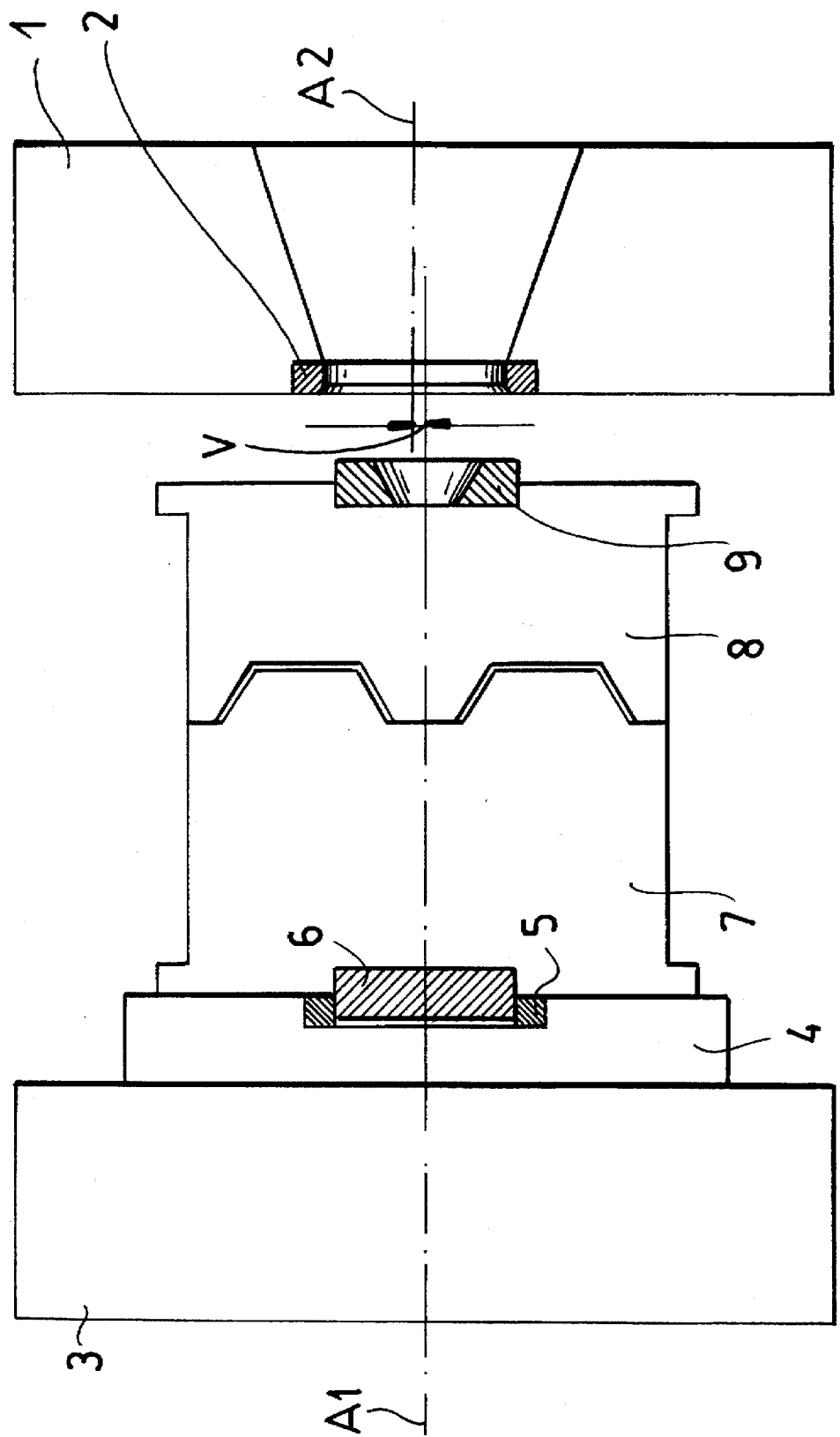
FIG. 1 is a partly sectional small-scale side view of a prior-art mold system.

As seen in FIG. 1 a prior-art injection-molding apparatus has a fixed mold support plate I provided with a centering ring 2 and a movable mold support plate 3 provided with a turntable 4 having a centering ring 5. A movable mold half 7 is fitted via its centering ring 6 in the ring 5 of the plate 3 and a fixed mold half 8 can fit via its centering ring 9 in the ring 2 of the plate 1. A new fixed mold half 8 is typically installed by fitting it to the movable mold half, and then pressing it toward the stationary plate i to fit the rings 2 and 9 together. This works perfectly when the rings 2 and 9 are perfectly axially aligned, but when the ring 9 is centered on an axis A1 offset slightly as depicted by V as illustrated from the axis A2 of the ring 2, this is impossible and adjustment is required. In the prior-art systems the ring 2 is normally unclamped and moved radially until it is aligned properly, an operation that takes some time and normally several tries to get right.

Figure 2:
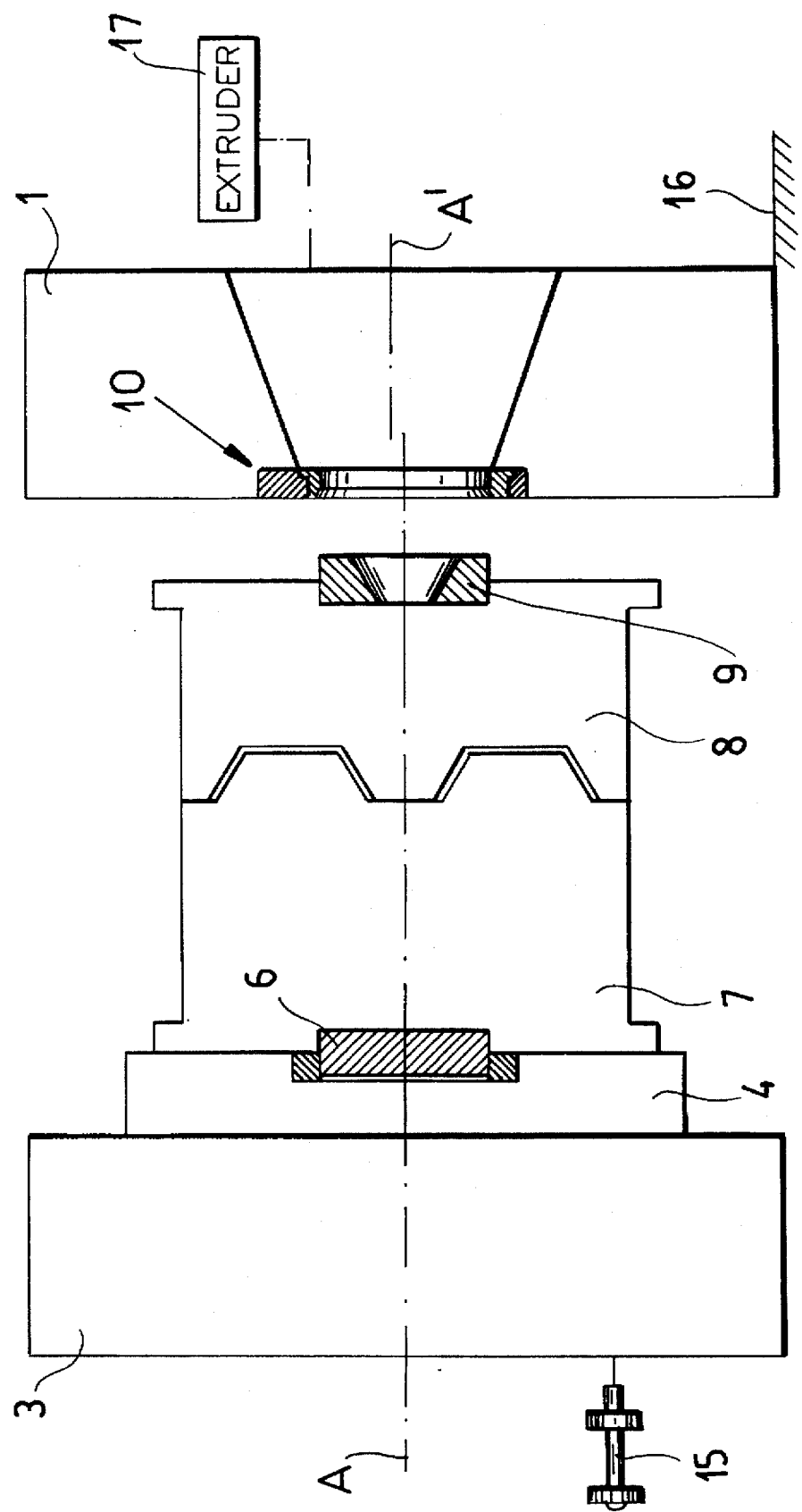
FIG. 2 is a view like FIG. 1 of the system of this invention.
Figure 3:
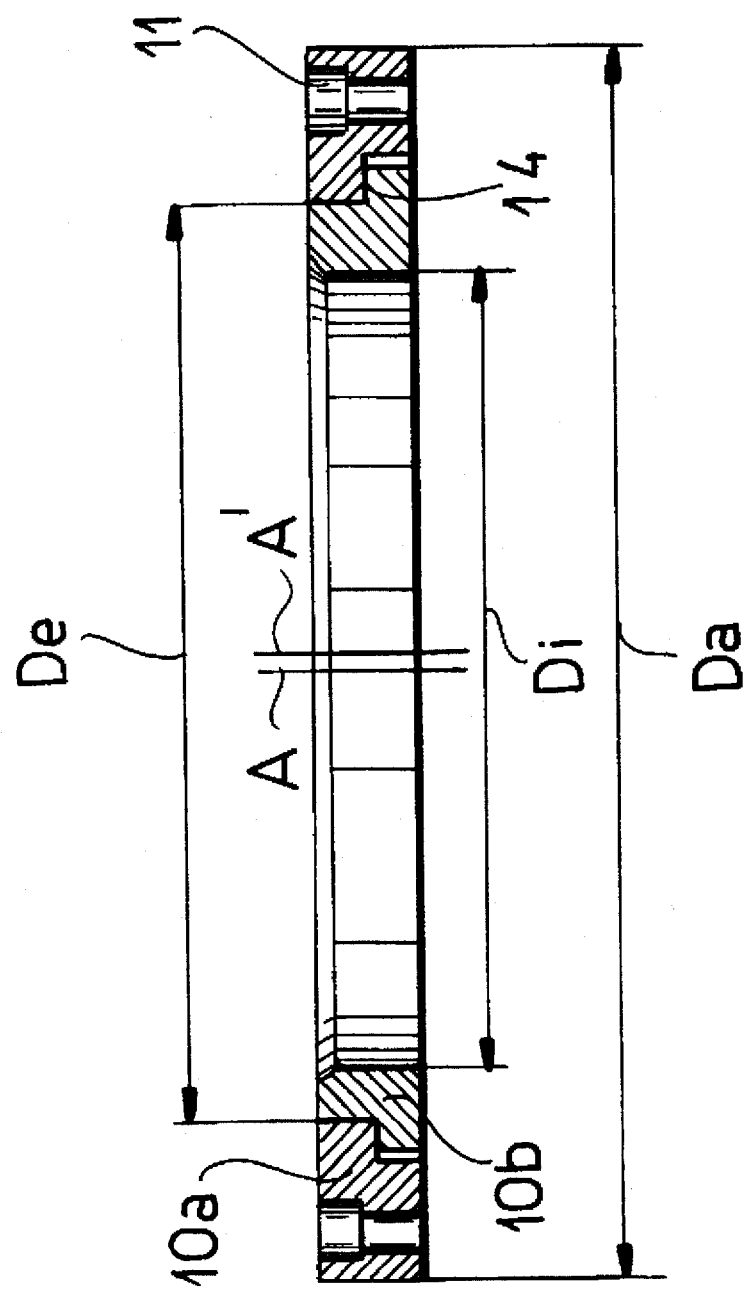
FIG. 3 is an axial section through an adjustable mold centering ring according to the invention.
Figure 4:
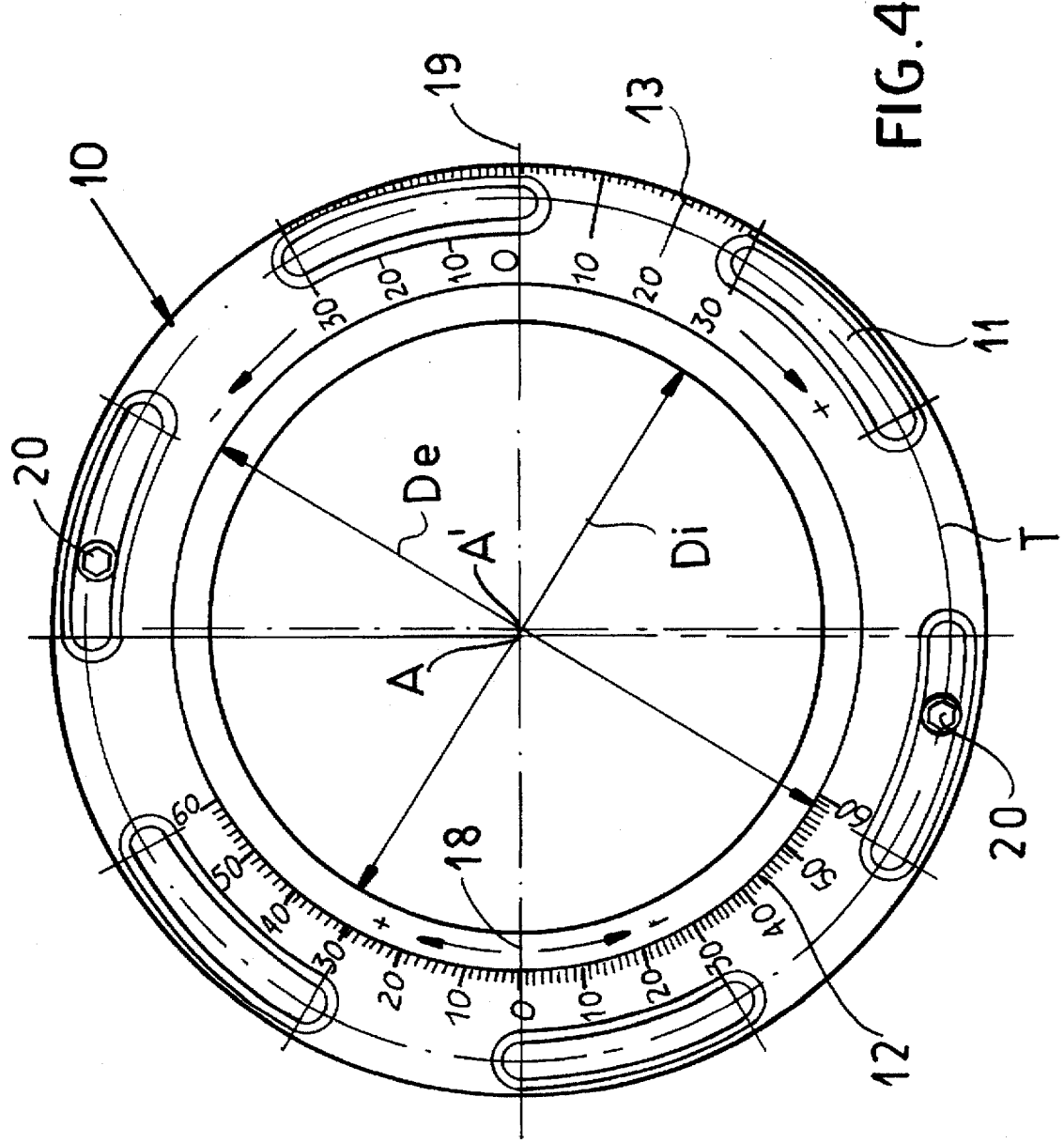
FIG. 4 is a top view of the structure of FIG. 3.

FIG. 2 shows a similar installation, with an actuator 15 for the mold-support plate 3, a fixed mount 16 for the plate 1, and an extruder 17. Here however the one-piece ring 2 is replaced with a ring 10 formed as shown in FIGS. 3 and 4 of an outer L-section annular part 10a and a complementary inner L-section annular part 10b. The outer part 10a has an outside diameter Da and an inside diameter De and the inner part 10b has an outside diameter De and an inside diameter Di, with the outer part 10a overreaching and holding the inner part 10b at 14. The center of curvature of the circular outer periphery of the outer part 10a lies on the axis A but the center of curvature of its circular inner periphery lies on an axis A' offset laterally therefrom. The inner and outer peripheries of the inner part 10b are coaxial, although it would be possible to make the inner ring part eccentric and the outer ring part coaxial. Either way when one of the ring parts is rotated relative to the other, the result is that that the inner periphery of the inner part moves radially.

The outer part 10a is formed with six angularly equispaced and angularly extending arcuate slots 11 and is provided along its inner periphery with a scale 12 and along its outer periphery with another scale 13. Markings 18 and 19 on the inner ring and support plate 1 cooperate with the scales 12 and 13. Screws 20 extend through the slots 11 to clamp the two rings solidly to the plate 1.

In use once the radial offset of the new fixed-mold part and the axis A is determined, the ring parts 10a and 10b are rotated appropriately to compensate, after of course loosening the bolts 20 to allow such rotation. Once the proper position is set the bolts 20 are tightened to lock in the setting. It is a relatively simple matter to establish which scale should be set to which reading to compensate for any possible offset, so that one measurement can be taken and then a table or calculator consulted to determine the necessary setting, getting it normally right the first time.

We claim:

1. An injection-molding assembly comprising:

a fixed mold plate carrying a centering ring;

a fixed mold half carrying a centering ring snugly interfitted with the fixed-plate centering ring;

a movable mold plate carrying a centering ring;

a movable mold half carrying a centering ring snugly interfitted with the movable-plate centering ring, one of the rings being formed of an outer ring part having a substantially circular outer periphery and a substantially circular inner periphery and an inner ring part having a substantially circular outer periphery and a substantially circular inner periphery, the outer periphery of one of the ring parts having a center of curvature offset radially from a center of curvature of the respective inner periphery; and means for relatively angularly displacing the ring parts of the one ring to respectively radially shift the respective mold plate and the respective mold half relative to each other and for clamping the ring parts relative to each other.

2. The injection-molding assembly defined in claim 1 wherein the one ring part is the outer ring part.

3. The injection-molding assembly defined in claim 1 wherein the one ring is the fixed-plate centering ring.

4. The injection-molding assembly defined in claim 1 wherein the one ring is provided with angularly extending centering scales.

5. The injection-molding assembly defined in claim 1 wherein the outer ring part is provided with a plurality of angularly extending slots, the clamping means including bolts traversing the slots.

6. The injection-molding assembly defined in claim 1 wherein the ring parts are of interfitting L-section.

\* \* \* \* \*